United States Patent
Lee

(10) Patent No.: US 10,576,794 B2
(45) Date of Patent: Mar. 3, 2020

(54) WHEEL VALVE ASSEMBLY WITH VENT TO ATMOSPHERE AND THE TIRE INFLATION SYSTEM MADE THEREWITH

(71) Applicant: Dana Heavy Vehicle Systems Group, LLC, Maumee, OH (US)

(72) Inventor: Pheng Lee, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/704,465

(22) Filed: Sep. 14, 2017

(65) Prior Publication Data

US 2018/0072112 A1    Mar. 15, 2018

Related U.S. Application Data

(60) Provisional application No. 62/394,487, filed on Sep. 14, 2016.

(51) Int. Cl.
| | |
|---|---|
| *B60C 23/00* | (2006.01) |
| *B60C 29/00* | (2006.01) |
| *B60C 29/06* | (2006.01) |
| *F16K 15/20* | (2006.01) |

(52) U.S. Cl.
CPC .......... *B60C 23/003* (2013.01); *B60C 23/004* (2013.01); *B60C 29/002* (2013.01); *B60C 29/06* (2013.01); *F16K 15/20* (2013.01)

(58) Field of Classification Search
CPC ..... B60C 23/003; B60C 23/004; B60B 7/002; B60B 7/0013
USPC ..... 152/417; 301/108.1, 108.2, 108.3, 108.4, 301/108.5
See application file for complete search history.

(56) References Cited

U.S. PATENT DOCUMENTS

| | | | |
|---|---|---|---|
| 3,395,950 A * | 8/1968 | Brandt | B60B 7/002 384/148 |
| 3,863,697 A * | 2/1975 | Brown | B60C 29/00 137/223 |
| 4,805,681 A | 2/1989 | Vollmer et al. | |
| 4,883,105 A | 11/1989 | Schultz | |

(Continued)

FOREIGN PATENT DOCUMENTS

| | | |
|---|---|---|
| DE | 8104435 U1 | 6/1982 |
| DE | 102014101280 A1 | 8/2015 |

(Continued)

OTHER PUBLICATIONS

European Patent Office, European Search Report and written opinion issued in Application 17191035.9, dated Dec. 15, 2017, 7 pages, European Patent Office, Munich, Germany.

Primary Examiner — Scott A Browne
(74) Attorney, Agent, or Firm — Marshall & Melhorn, LLC

(57) ABSTRACT

A tire inflation system wheel valve assembly is provided. The wheel valve assembly may include a body portion coupled with a cover portion. A diaphragm may be disposed between the body portion and the cover portion. The diaphragm and the body portion define a control cavity; and the diaphragm and the cover portion define a cover cavity. At least one control port is in fluid communication with the control cavity. In addition, a tire port is in selective fluid communication with the control cavity. Further, the cover portion defines an aperture in fluid communication with the atmosphere and the cover cavity.

11 Claims, 7 Drawing Sheets

(56) References Cited

U.S. PATENT DOCUMENTS

| | | |
|---|---|---|
| 4,893,664 A | 1/1990 | Oltean |
| 6,408,913 B1 | 6/2002 | Caretta et al. |
| 7,089,953 B2 | 8/2006 | Beau |
| 7,686,051 B2 | 3/2010 | Medley et al. |
| 9,352,621 B2 | 5/2016 | Morgan |
| 2005/0062340 A1* | 3/2005 | Denton .................. B60B 7/002 301/108.1 |
| 2005/0133134 A1* | 6/2005 | Ingram ................ B60C 23/003 152/417 |
| 2005/0205182 A1 | 9/2005 | Maquaire et al. |
| 2014/0152081 A1* | 6/2014 | Leung .................. B60B 7/0013 301/108.2 |
| 2014/0224352 A1* | 8/2014 | Racine ................. B60C 23/003 137/223 |
| 2015/0096655 A1 | 4/2015 | Koulinitch et al. |
| 2016/0144675 A1 | 5/2016 | Knepple et al. |
| 2016/0167458 A1 | 6/2016 | Laanemets et al. |
| 2016/0169762 A1 | 6/2016 | Summers et al. |

FOREIGN PATENT DOCUMENTS

| | | |
|---|---|---|
| GB | 2094447 A | 9/1982 |
| JP | H01109109 A | 4/1989 |
| WO | 2016094633 A1 | 6/2016 |

\* cited by examiner

WHEEL VALVE ASSEMBLY WITH VENT TO ATMOSPHERE AND THE TIRE INFLATION SYSTEM MADE THEREWITH

BACKGROUND

This disclosure relates to tire inflation systems and more particularly to a wheel valve assembly utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire life-span. In addition, tire inflation systems increase a vehicle's maneuverability over differing terrains and reduce maintenance requirements.

Tire inflation systems often employ a wheel valve assembly to communicate pressurized fluid to a wheel assembly, to retain fluid in a wheel assembly and adjust or maintain the pressure thereof. Conventional wheel valves may suffer from performance issues due to the range of temperatures they operate in, altitude, the forces they are exposed to, and/or the specialized functions they are designed to perform. Further, hot and cold temperatures and changes in altitude may create pressure differences within the tire inflation system which can cause a failure of the system. In view of the above, there remains a need for a wheel valve assembly operable in an increased temperature and altitude range.

SUMMARY

The present disclosure provides for an assembly for a tire inflation system including a wheel valve assembly operable in an increased temperature and pressure range. In one embodiment, the wheel valve assembly includes a body portion coupled with a cover portion. A diaphragm may be disposed between the body portion and the cover portion. A control cavity is defined by the diaphragm and the body portion; and a cover cavity is defined by the diaphragm and the cover portion. At least one control port is in fluid communication with the control cavity. In addition, a tire port is in selective fluid communication with the control cavity. Further, the cover portion defines an aperture in fluid communication with the atmosphere and the cover cavity.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
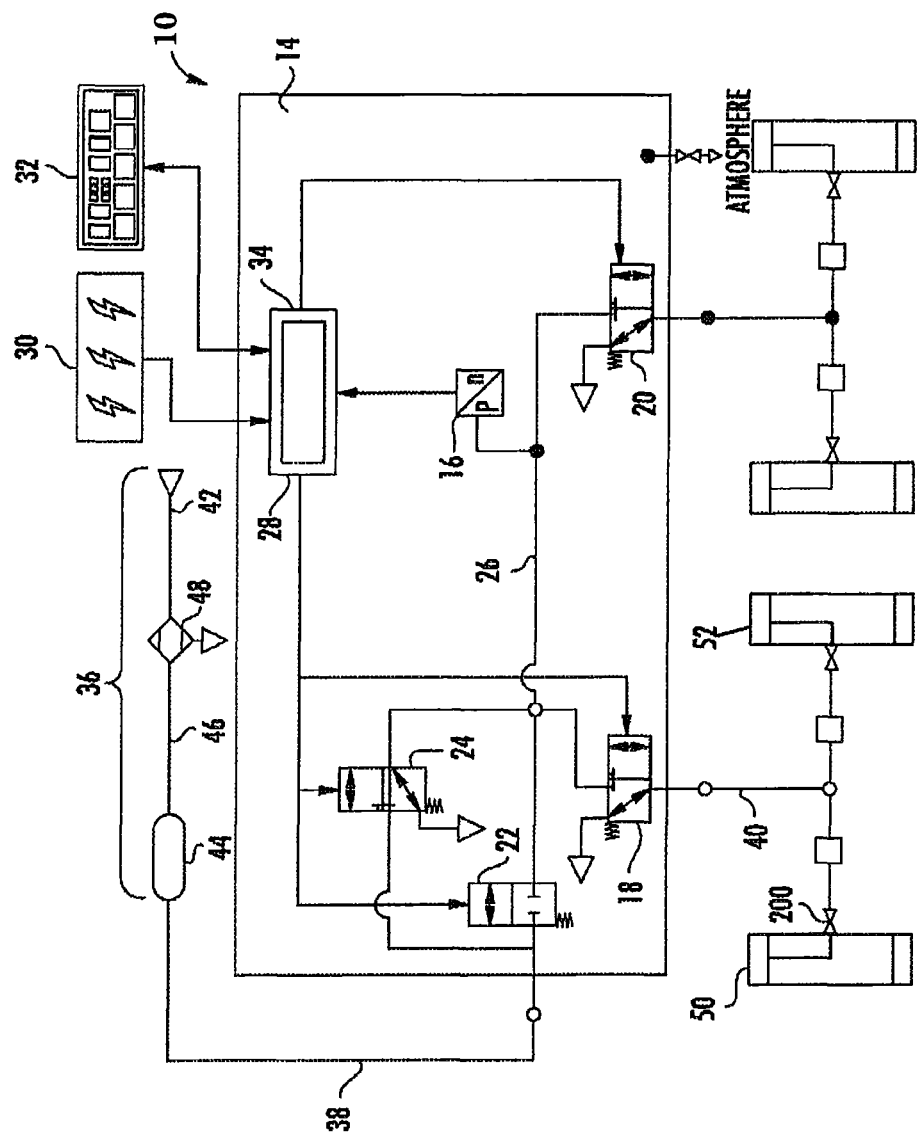
FIG. 1 schematically depicts a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a commercial vehicle. Further, the tire inflation system 10 described herein may have applications in both light duty and heavy duty vehicles, and for passenger, commercial, and off-highway vehicles. It would be understood by one of ordinary skill in the art that the tire inflation system 10 has industrial, locomotive, military, agricultural, and aerospace applications.

A schematic depiction of an embodiment of the tire inflation system 10 is illustrated in FIG. 1. The tire inflation system 10 is described herein with reference to a pressurized fluid such as, for example, air. The tire inflation system 10 may have inflate and/or deflate capability to allow a tire pressure to be increased and/or decreased.

The tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those familiar in the relevant art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may be in fluid communication with a plurality of tires.

Figure 2:
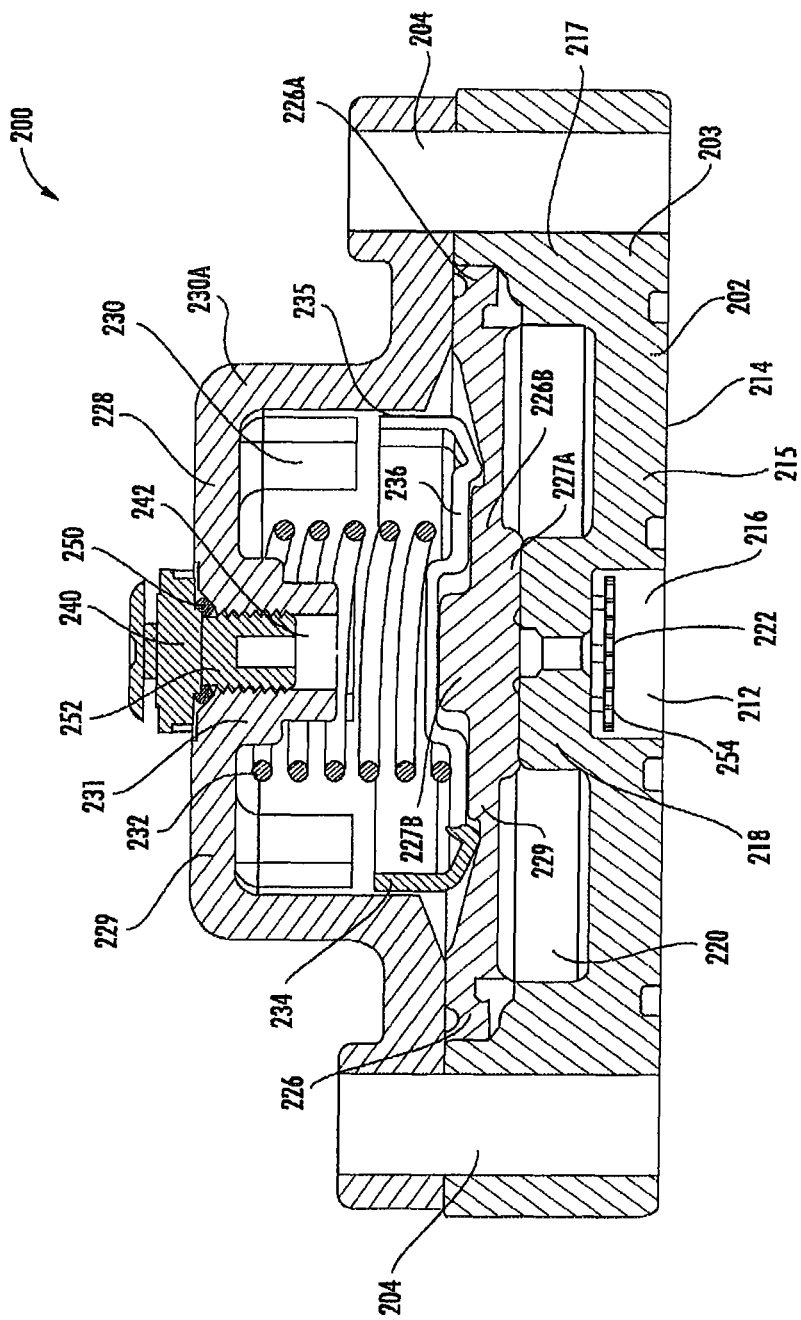
FIG. 2 is a cross-sectional view of an embodiment of a wheel valve assembly of the tire inflation system of FIG. 1.

The fluid control circuit 40 comprises a wheel valve assembly 200. The wheel valve assembly 200 is associated with a tire 50. As illustrated in FIG. 2, in an embodiment, the wheel valve assembly 200 comprises a valve body 202. The valve body 202 may be generally cylindrical in geometry having a first pair of fastener apertures 204 located at generally opposite positions at an outside portion of the valve body 202. A second pair of fastener apertures 206 are also located at generally opposite positions at an outside portion of the valve body 202. In an embodiment, the first and second fastener apertures 204, 206 are equilaterally spaced about the valve body 202. In an embodiment, the valve body 202 comprises four semicylindrical portions 208 having longitudinal axes extending parallel to a longitudinal axis of the valve body 202. The first and second pairs of fastener apertures 204, 206 may be at least partially disposed through the semicylindrical portions 208.

Figure 3:
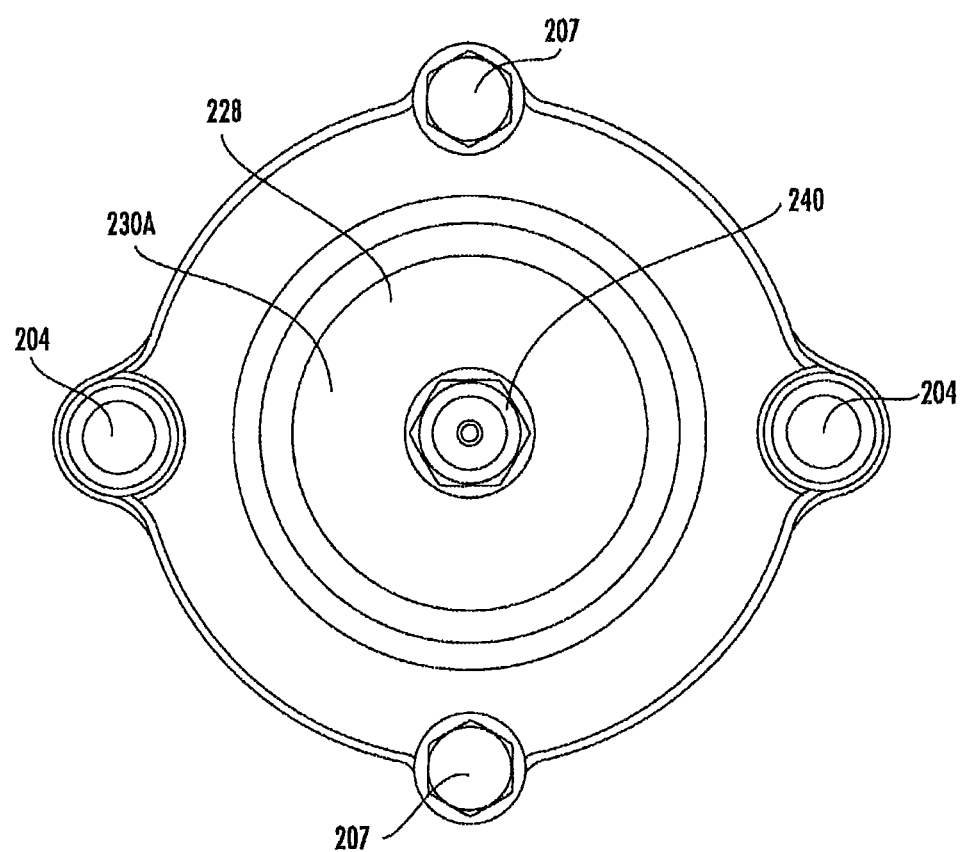
FIG. 3 is a top view of the wheel valve assembly of FIG. 2.

The valve body 202 may comprise a base portion 203 and a cover portion 228. As illustrated in FIG. 3, the base portion 203 and the cover portion 228 may be coupled via fasteners 207 disposed through the second pair of fastener apertures 206. A pair of fasteners (not depicted) may also be disposed through the first fastener apertures 204 for coupling the wheel valve assembly 200 with a wheel (not depicted).

The base portion 203 comprises a first wall 215 defining a surface 214. The surface 214 includes a tire port 212. The tire port 212 comprises an opening 216 in the first wall 215. The base portion 203 further comprises a protuberance 218 axially extending from the first wall 215 toward the cover portion 228. In an embodiment, the protuberance 218 may be cylindrical. A channel 222 is disposed through the protuberance 218 and is in selective fluid communication with the tire port opening 216. In an embodiment, a discoid screen filter 254 may be disposed in and coupled with the tire port 212.

The base portion 203 also includes a second wall 217 that is generally cylindrical and coupled with the first wall 215. The second wall 217 is disposed transverse to the first wall 215. The first wall 215, the second wall 217, and the protuberance 218 define a portion of an annular control cavity 220.

Figure 4:
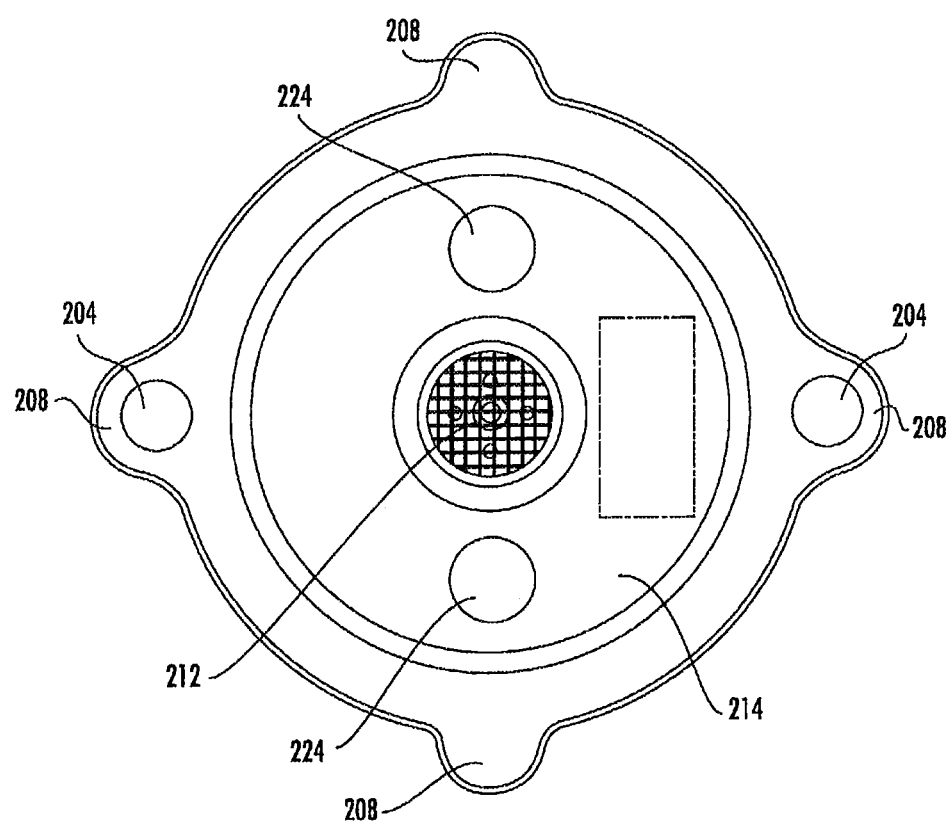
FIG. 4 is a bottom view of the wheel valve assembly of FIG. 2.
Figure 5:
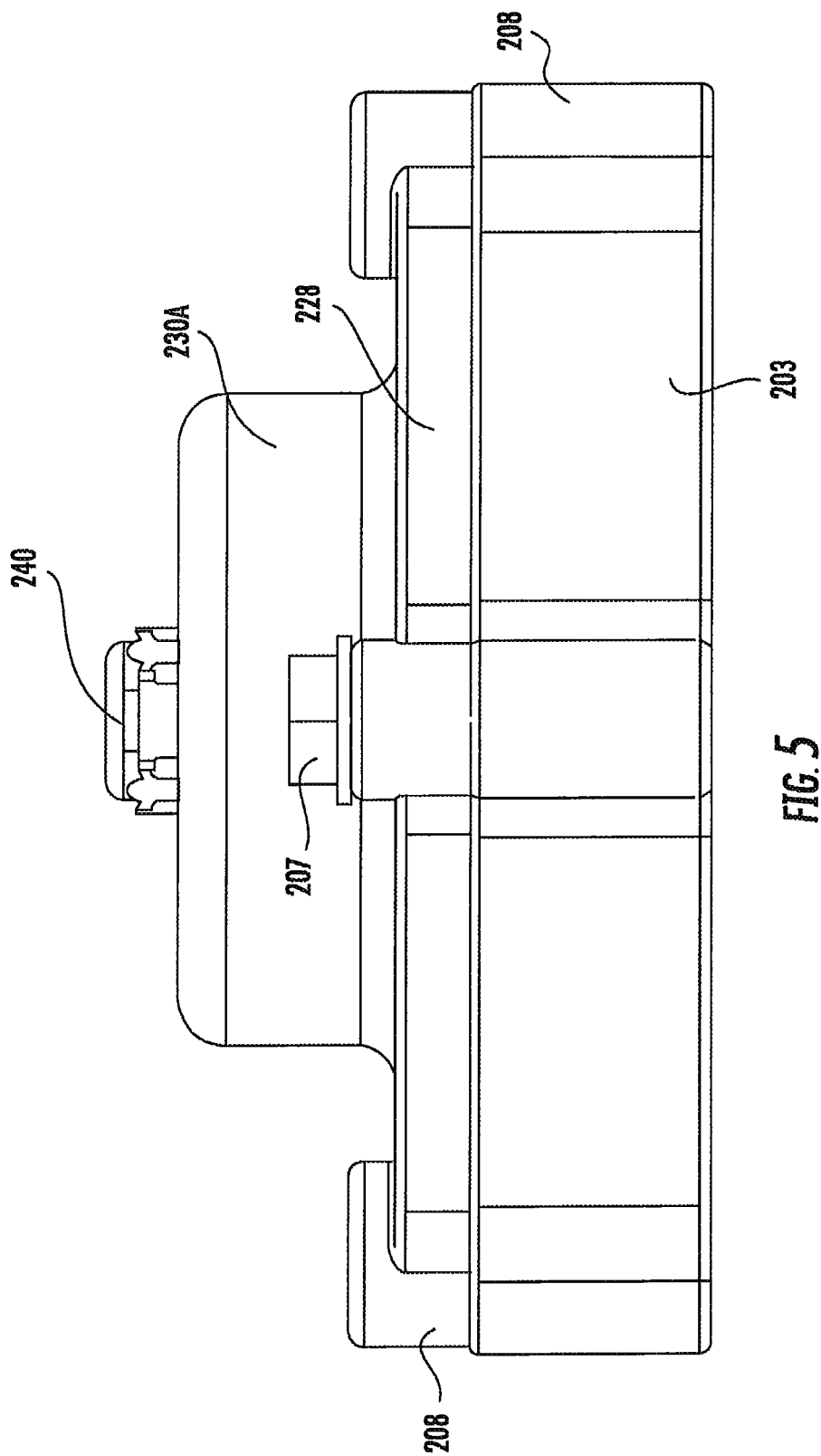
FIG. 5 is a side view of the wheel valve assembly of FIG. 2.

As illustrated in FIG. 4, a pair of control ports 224 are disposed through the base portion first wall 215. The control ports 224 are in fluid communication with the control cavity 220. The control ports 224 are also in fluid communication with the control unit 14. Further, the control ports 224 are in selective fluid communication with the tire port 212 via the control cavity 220 and a diaphragm 226 (further described intra).

The tire port 212 is in fluid communication with the tire 50. The control unit 14 and the tire 50 are in selective fluid communication via the control ports 224, the control cavity 220, and the tire port 212. The tire port channel 222 disposed through the protuberance 218 places the control cavity 220 in selective fluid communication with the tire port 212 aperture 216.

As illustrated in FIGS. 2, 3, 5 and 6, the wheel valve body 202 comprises the cover portion 228. The cover portion 228 includes semicylindrical portions defining a portion of the first and second pair of fastener apertures 204, 206. The cover portion 228 also comprises an axially extending portion 230A which at least partially defines a cover cavity 230. The axially extending portion 230A may comprise a cylindrical geometry. The cover cavity 230 and the control cavity 220 are separated by, and partially defined by, the diaphragm 226. Further, the cover portion 228 at least partially house a biasing member 232 and a backing plate 234.

The diaphragm 226 comprises a generally discoid member including a first portion 226A and a second portion 226B. The first portion 226A is coupled between the cover portion 228 and the base portion 203 such that the second portion 226B of the diaphragm 226 may actuate in an axial direction. The second portion 226B includes a first axially extending protrusion 227A. The first protrusion 227A defines a surface which selectively sealingly engages the protuberance 218 and seals the channel 222. The second portion 226B includes a second axially extending protrusion 227B which projects opposite the first protrusion 227A.

The second portion 226B further includes a discoid shoulder 229. The second protrusion 227B and the shoulder 229 of the diaphragm 226 are engaged with, and at least partially located within, complimentary depressions in a first wall 236 of the backing plate 234. The backing plate 234 includes a generally cylindrical second wall 235. The second wall 235 may guide the backing plate 234 in the cover cavity 230 during actuation of the diaphragm 226.

At a static state, the biasing member 232 engages an interior surface of the cover portion 228 at a first end of the biasing member 232, and engages a surface of the first wall 236 of the backing plate 234 at a second end. The backing plate 234 engages the diaphragm 226 and, via the biasing member 232, drives the diaphragm 226 into sealing contact with the protuberance 218. The diaphragm 226 thereby seals the tire port channel 222.

During inflation, deflation, or pressure checks of the tire 50, pressurized fluid enters the control cavity 220 via the control ports 224. The increased pressure in the control cavity 220 exerts a force on the diaphragm 226 in the axial direction and thereby at least partially compresses the biasing member 232.

When the wheel valve assembly 200 is exposed to high temperatures during a static state, or a change in altitude, pressure may increase in the cover cavity 230. Traditionally, the increased pressure in a wheel valve assembly might degrade the overall performance of the wheel valve assembly. For example, increased pressure in a conventional wheel valve assembly may increase the force necessary to open the wheel valve assembly such that a control unit may be in fluid communication with a wheel assembly. Also, under low temperature conditions, or due to a change in altitude, pressure may decrease in a wheel valve assembly and create a vacuum in a cover cavity.

In the presently disclosed subject matter, to overcome problems presented by increased or decreased pressure in the cover cavity 230, the wheel valve assembly 200 may comprise a vent assembly 240. In an embodiment, as illustrated in FIGS. 2, 4, 5 and 6, the vent assembly 240 may comprise a screw-in vent. Permitting fluid communication between the cover cavity 230 and the atmosphere prevents pressure from increasing in the cover cavity 230 and requiring increasing the fluid pressure in the control cavity 220 necessary to actuate the diaphragm 226. Fluid communication between the cover cavity 230 and the atmosphere also prevents a vacuum from developing in the cover cavity 230 which may cause the pressurized fluid in the control cavity 220 to actuate the diaphragm 226 and compress the biasing member 232. In an embodiment, the presently disclosed subject matter permits the wheel valve assembly 200 to deflate the tire 50 under temperature conditions up to 250° Fahrenheit.

Figure 6:
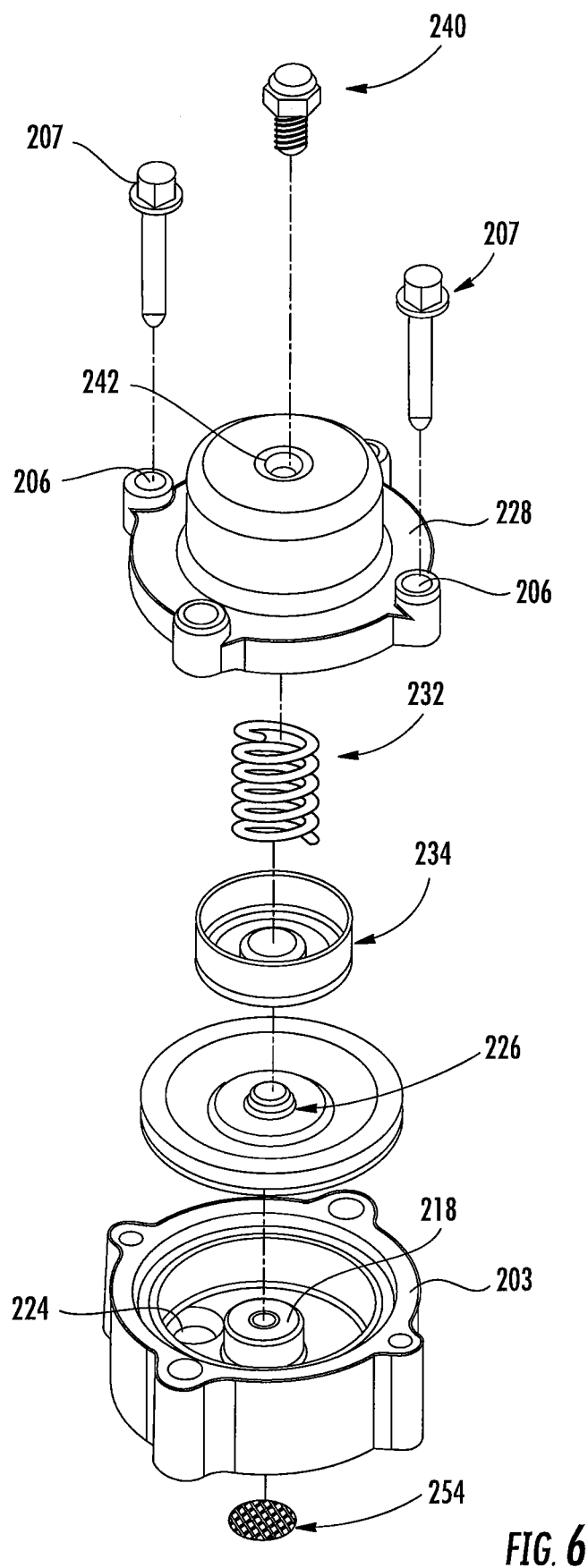
FIG. 6 is an exploded view of the wheel valve assembly of FIG. 2.

As illustrated in FIGS. 2 and 6, the cover portion 228 includes an aperture 242 therethrough. The vent assembly 240 is sealingly coupled with the aperture 242 and allows the cover cavity 230 fluid communication with the atmosphere. In an embodiment, the vent assembly 240 comprises a threaded portion which engages a threaded portion of the aperture 242. In an embodiment, a wall 229 of the axially extending portion 230A includes the aperture 242. The aperture 242 may be concentric with the longitudinal axis of the wheel valve assembly 200. A portion 231 of the cover wall 229 may axially extend towards the base portion 203. The axially inward extending portion 231 may be concentric with and define the aperture 242. Further, the axially inward extending portion 231 may act as a positioning guide for the biasing member 232. In an embodiment, the axially inward extending portion 231 comprises a stepped outer surface.

The vent assembly 240 includes a filter (not depicted) which permits the fluid communication of gas, such as air, between the cover cavity 230 and the atmosphere. The filter prevents or impedes fluids, such as water, and debris from entering into the cover cavity 230. In an embodiment, the vent assembly 240 filter may be an oleophobic membrane. The vent assembly 240 also includes a sealing member 250, such as an O-ring, disposed about a shank 252 of the vent assembly 240. In an embodiment, the sealing member 250 sealingly engages a chamfered portion of the cover 228 about the aperture 242, and sealingly engages the vent assembly 240. The sealing member 250 prevents fluids, including but not limited to water, and debris from entering the aperture 242 and the cover cavity 230.

Figure 7:
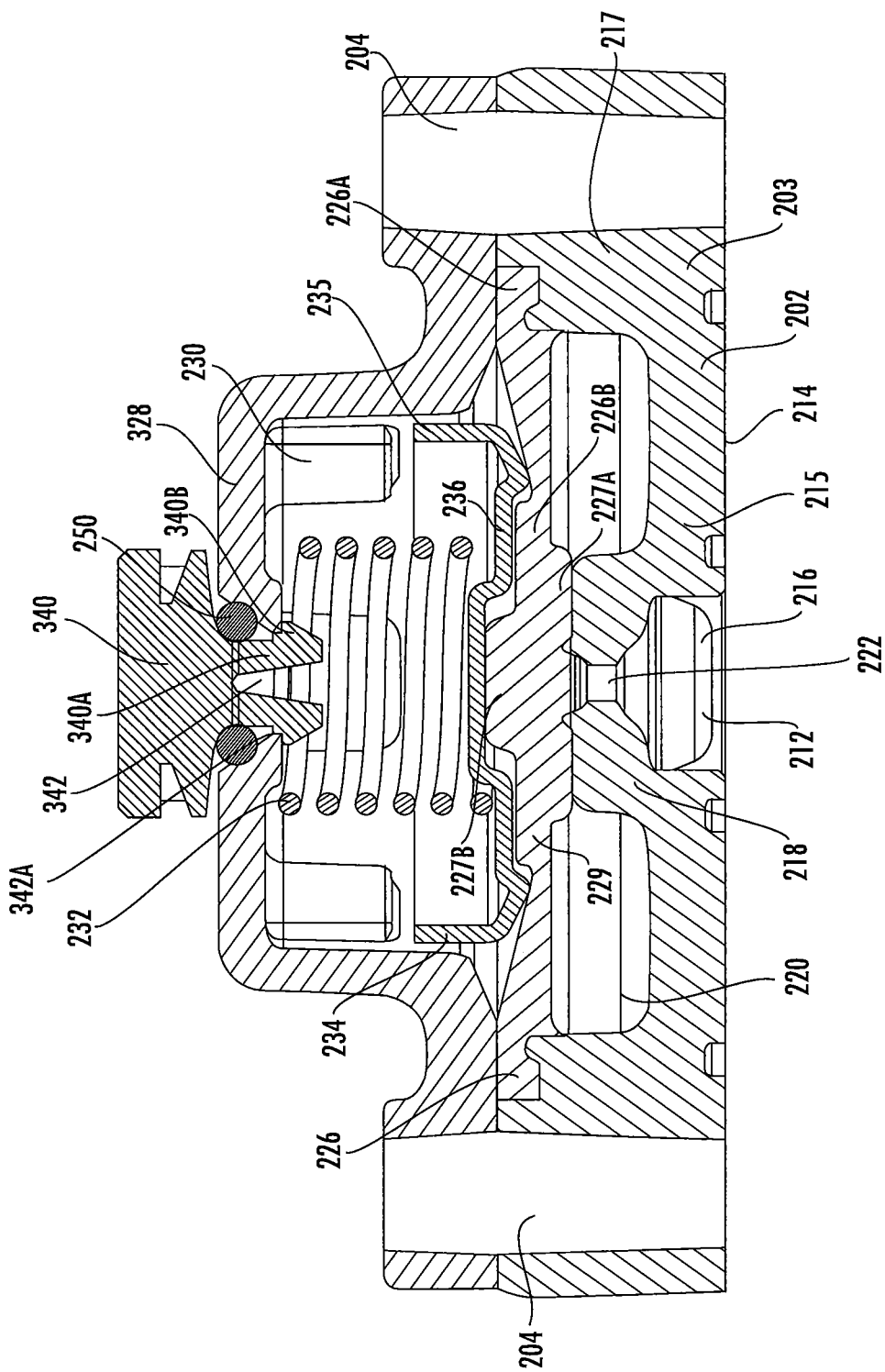
FIG. 7 is a cross-sectional view of another embodiment of a wheel valve assembly of the tire inflation system of FIG. 1.

As illustrated in FIG. 7, in another embodiment, the wheel valve assembly 200 may comprise a vent assembly 340. In this embodiment, the wheel valve assembly 200 may comprise a cover portion 328. The cover portion 328 includes an aperture 342 therethrough. The aperture 342 defines an aperture surface 342A having an increasing diameter from the inner surface of the cover portion 328 to the outer surface of the cover portion 328. The sealing member 250 sealingly engages the aperture surface 342A and the vent assembly 340. The vent assembly 340 is disposed through the aperture 342 and coupled with the cover portion 328. The vent assembly 340 comprises at least one resilient member 340A having a tab 340B for coupling the vent assembly 340 with the cover portion 328. The vent assembly resilient member 340A creates a snap-fit coupling of the vent assembly 340 with the cover portion 328.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A wheel valve assembly comprising:
   a body portion having a wall defining a bottom surface, wherein the body portion comprises a protuberance axially extending from the wall;
   a cover portion coupled with said body portion;
   a diaphragm disposed between said body portion and said cover portion, wherein the diaphragm includes a first axially extending protrusion defining a surface which selectively sealingly engages the protuberance;
   a control cavity defined by said body portion and said diaphragm;
   a cover cavity defined by said cover portion and said diaphragm;
   at least one control port in fluid communication with said control cavity;
   a tire port in selective fluid communication with said control cavity, wherein the tire port is disposed in the bottom surface of the wall and the at least one control port is disposed through the wall, and wherein the at least one control port is in selective communication with the tire port via the control cavity and the diaphragm; and
   wherein said cover portion defines an aperture in fluid communication with an atmosphere and said cover cavity, wherein a vent assembly with one or more chamfered edges is disposed in the aperture, wherein said vent assembly impedes water and debris and said vent assembly is coupled with said cover portion, and wherein said vent assembly includes at least one resilient member, wherein said resilient member has a tab for coupling said vent assembly with said cover portion.

2. The wheel valve assembly according to claim 1, wherein said cover portion comprises an axially inward extending portion concentric with said aperture.

3. The wheel valve assembly according to claim 1, wherein: said vent assembly is disposed coaxially with a centerline of said cover portion.

4. The wheel valve assembly according to claim 2, further comprising: a biasing member disposed between said cover portion and said diaphragm, wherein said inward extending portion extends at least partially into said biasing member.

5. The wheel valve assembly according to claim 1, wherein said cover portion includes a chamfered surface disposed about said aperture.

6. The wheel valve assembly according to claim 5, further comprising: a sealing member disposed about a portion of said vent assembly, wherein said sealing member sealingly engages said chamfered surface.

7. The wheel valve assembly according to claim 1, wherein said aperture defines an aperture surface having an increasing diameter.

8. The wheel valve assembly according to claim 1, further comprising a sealing member sealingly engaging an aperture surface and said vent assembly.

9. The wheel valve assembly according to claim 1, wherein said vent assembly is disposed through said aperture.

10. The wheel valve assembly according to claim 1, wherein said vent assembly and said cover portion are coupled via a snap-fit.

11. A wheel valve assembly comprising:
a body portion having a wall defining a bottom surface, wherein the body portion comprises a protuberance axially extending from the wall;
a cover portion coupled with said body portion;
a diaphragm disposed between said body portion and said cover portion, wherein the diaphragm includes a first axially extending protrusion defining a surface which selectively sealingly engages the protuberance;
a control cavity defined by said body portion and said diaphragm;
a cover cavity defined by said cover portion and said diaphragm;
at least one control port in fluid communication with said control cavity;
a tire port in selective fluid communication with said control cavity, wherein the tire port is disposed in the bottom surface of the wall and the at least one control port is disposed through the wall, and wherein the at least one control port is in selective communication with the tire port via the, control cavity and the diaphragm; and
wherein said cover portion defines an aperture in fluid communication with an atmosphere and said cover cavity, wherein said aperture defines a threaded portion, wherein a vent assembly is disposed in the aperture, engaging one or more chamfered edges of the aperture, and wherein said vent assembly is coupled with said cover portion.

* * * * *